US010721905B2

(12) United States Patent
VanBuuren et al.

(10) Patent No.: US 10,721,905 B2
(45) Date of Patent: Jul. 28, 2020

(54) ANIMAL PEN WITH REMOVABLE DIVIDERS

(71) Applicant: Poly Dome Ontario Inc., Grassie (CA)

(72) Inventors: Darren VanBuuren, Grassie (CA); Burton Mark Wood, Lindsay (CA)

(73) Assignee: Poly Dome Ontario Inc., Grassie (CA)

( * ) Notice: Subject to any disclaimer, the term of this patent is extended or adjusted under 35 U.S.C. 154(b) by 241 days.

(21) Appl. No.: 15/690,924

(22) Filed: Aug. 30, 2017

(65) Prior Publication Data

US 2018/0055000 A1 Mar. 1, 2018

Related U.S. Application Data

(60) Provisional application No. 62/381,424, filed on Aug. 30, 2016.

(51) Int. Cl.
*A01K 1/00* (2006.01)
*A01K 1/02* (2006.01)

(52) U.S. Cl.
CPC .............. *A01K 1/00* (2013.01); *A01K 1/0011* (2013.01); *A01K 1/0088* (2013.01); *A01K 1/02* (2013.01); *A01K 1/0209* (2013.01)

(58) Field of Classification Search
CPC ...... A01K 1/00; A01K 1/0005; A01K 1/0011; A01K 1/02; A01K 1/0209; A01K 1/0227; A01K 1/0088
See application file for complete search history.

(56) References Cited

U.S. PATENT DOCUMENTS

| 2,555,396 | A | | 6/1951 | Cosner | |
|---|---|---|---|---|---|
| D175,798 | S | | 10/1955 | Price | |
| 3,541,994 | A | * | 11/1970 | Sauey | A01K 1/0227 119/528 |
| 3,858,555 | A | * | 1/1975 | Smith | A01K 1/0227 119/513 |
| D244,737 | S | | 6/1977 | Henry | |
| D355,510 | S | | 2/1995 | Duncan | |
| 5,509,376 | A | | 4/1996 | Tsengas | |

(Continued)

FOREIGN PATENT DOCUMENTS

| GB | 2289244 A | * | 11/1995 | ......... B60R 21/026 |
|---|---|---|---|---|
| JP | 2008278766 A | * | 11/2008 | |

*Primary Examiner* — Son T Nguyen
(74) *Attorney, Agent, or Firm* — Walter | Haverfield LLP; Sean F. Mellino; D. Peter Hochberg

(57) ABSTRACT

A modular animal pen system comprises front and rear panels and opposed side panels extending between the front and rear panels to form a primary enclosure. The front panel has adjacent doorway apertures formed therein to receive respective selectively closable gates, and a mullion is disposed between the doorway apertures. The mullion has a first slot, and a second slot in the rear panel is in registration with the first slot. The animal pen system further comprises a removable divider panel whose longitudinal ends are sized to fit removably within the respective slots so that the divider panel can divide the primary enclosure into two secondary enclosures. The side and divider panels may be formed by interchangeable profile panels, and the front and rear panels may be formed by interchangeable face panels connectable end-to-end to form a junction slot therebetween sized to receive the longitudinal ends of the profile panels.

9 Claims, 26 Drawing Sheets

(56) References Cited

U.S. PATENT DOCUMENTS

| | | | |
|---|---|---|---|
| D393,107 S | 3/1998 | Tsengas | |
| 5,842,545 A | 12/1998 | Blaiotta | |
| D410,291 S | 5/1999 | Ito | |
| 6,059,491 A * | 5/2000 | Striefel | E01F 15/086 256/13.1 |
| D440,108 S | 4/2001 | Derman | |
| D455,238 S | 4/2002 | Small | |
| D483,157 S | 12/2003 | Yang | |
| 6,945,194 B2 * | 9/2005 | Fritsch | A01K 1/0088 119/454 |
| D522,181 S | 5/2006 | Lauzon | |
| D552,988 S | 10/2007 | Kisch | |
| D553,819 S | 10/2007 | Brothers | |
| D567,085 S | 4/2008 | Rim et al. | |
| D570,684 S | 6/2008 | Kisch | |
| D581,782 S | 12/2008 | Kisch | |
| 7,487,744 B1 * | 2/2009 | Goldberg | A01K 1/031 119/453 |
| D593,259 S | 5/2009 | VanderDussen | |
| D617,958 S | 6/2010 | Benincasa et al. | |
| D619,307 S | 7/2010 | Martin | |
| D619,393 S | 7/2010 | Golias et al. | |
| D621,560 S | 8/2010 | McMurphy | |
| 7,807,080 B2 | 10/2010 | Hampel | |
| D630,803 S | 1/2011 | Lee et al. | |
| D637,358 S | 5/2011 | Greenthal | |
| D641,935 S | 7/2011 | Sullivan | |
| 8,186,306 B2 | 5/2012 | Hampel | |
| D665,951 S | 8/2012 | Lloyd | |
| D667,175 S | 9/2012 | McMurphy | |
| D676,612 S | 2/2013 | Wygle | |
| D685,532 S | 7/2013 | Hampel et al. | |
| D686,784 S | 7/2013 | Elliott et al. | |
| D688,010 S | 8/2013 | DiOrio | |
| D700,367 S | 2/2014 | Shen | |
| 8,763,561 B2 | 7/2014 | Hampel | |
| 8,771,568 B2 | 7/2014 | Hampel | |
| D710,556 S | 8/2014 | Muzaffer | |
| D721,209 S | 1/2015 | Hove et al. | |
| D725,833 S | 3/2015 | Trifiro | |
| 8,973,533 B2 | 3/2015 | Hampel et al. | |
| D739,957 S | 9/2015 | Gulbrandsen et al. | |
| 9,260,897 B2 | 2/2016 | Wolk | |
| D750,811 S | 3/2016 | Peters | |
| D762,458 S | 8/2016 | Home | |
| D769,020 S | 10/2016 | Yedikian | |
| D769,550 S | 10/2016 | Oxboel et al. | |
| D774,663 S | 12/2016 | Nigro | |
| 9,591,828 B2 | 3/2017 | Hampel et al. | |
| D789,620 S | 6/2017 | Hampel | |
| D794,222 S | 8/2017 | Kilian et al. | |
| D795,691 S | 8/2017 | Bankowski | |
| D797,554 S | 9/2017 | Bankowski | |
| D804,739 S | 12/2017 | Ksiazek et al. | |
| D807,705 S | 1/2018 | Laurain | |
| D820,623 S | 6/2018 | Akana et al. | |
| D823,109 S | 7/2018 | Bankowski | |
| D824,116 S | 7/2018 | Couse et al. | |
| D825,329 S | 8/2018 | Ross | |
| D827,210 S | 8/2018 | Cantwell et al. | |
| D827,211 S | 8/2018 | Cronkhite | |
| D830,647 S | 10/2018 | Le | |
| D831,394 S | 10/2018 | Brooks | |
| D833,862 S | 11/2018 | Nelson et al. | |
| D839,491 S | 1/2019 | Veness | |
| D839,492 S | 1/2019 | Cantwell et al. | |
| 2003/0173396 A1 | 9/2003 | Naughton et al. | |
| 2006/0152850 A1 | 7/2006 | Hsu et al. | |
| 2009/0272330 A1 * | 11/2009 | Hampel | A01K 1/0011 119/514 |
| 2009/0314827 A1 | 12/2009 | Grigor | |
| 2010/0032334 A1 | 2/2010 | Weideman | |
| 2011/0100302 A1 * | 5/2011 | Van Buuren | A01K 1/0088 119/512 |
| 2013/0081575 A1 * | 4/2013 | Hampel | A01K 1/0088 119/502 |
| 2014/0261222 A1 | 9/2014 | Hampel et al. | |
| 2016/0095289 A1 | 4/2016 | Hampel et al. | |
| 2017/0210504 A1 | 7/2017 | Aguirre | |

* cited by examiner

ANIMAL PEN WITH REMOVABLE DIVIDERS

CROSS-REFERENCE TO RELATED APPLICATION

This application claims priority to and the benefit of U.S. Provisional Application Ser. No. 62/381,424 filed on Aug. 30, 2016, the entirety of which is incorporated herein by reference.

TECHNICAL FIELD

The present invention relates to animal pen systems.

BACKGROUND

When raising young animals such as calves, goats and the like, after weaning the animals it is customary to begin with each animal in a separate enclosure, and then place the animals together in groups once they have reached a certain level of maturity (e.g. a certain number of weeks of age).

SUMMARY

The present disclosure describes a modular pen system with removable dividers which can be arranged in a plurality of different configurations to selectively group animals together or isolate them from one another.

In one aspect, a modular animal pen system comprises a front panel, a rear panel and two opposed side panels secured to and extending between the front panel and the rear panel to form a primary enclosure. The front panel has at least two adjacent doorway apertures formed therein; the doorway apertures being adapted to receive respective selectively closable gates. The front panel also has a mullion disposed between the at least two doorway apertures. The mullion has a first slot formed therethrough, and the rear panel has a second slot formed therethrough in registration with the first slot. The animal pen system further comprises a removable divider panel whose longitudinal ends are sized to fit removably within the respective slots so that, when the divider panel is positioned with its longitudinal ends within the respective slots, the divider panel extends between the front panel and the rear panel so as to divide the primary enclosure into two secondary enclosures.

In one embodiment, the front panel and the rear panel are formed by face panels of identical construction so as to be interchangeable with one another whereby the first and second slots are mullion slots, and the side panels and the divider panel are formed by profile panels of identical construction so as to be interchangeable with one another.

In one embodiment, opposed longitudinal ends of the face panels are interengageable with one another so that face panels can be connected end-to-end and, when connected, the longitudinal ends of two adjacent face panels form a junction slot therebetween, with the junction slot being adapted to removably receive the longitudinal end of one of the profile panels.

The mullion slots may be closed at inferior ends of the mullions and have open ends at superior ends of the mullions.

In some embodiments, the longitudinal ends of the profile panels each comprise a longitudinally extending profile panel projection sized to fit removably within the mullion slots and the junction slots and at least one shoulder disposed inwardly of the profile panel projection. The shoulders are positioned to cooperate to longitudinally trap the profile panels between the front panel and the rear panel when the profile panel projections are received in the first and second slots.

In certain embodiments, each face panel has a retention element associated with each mullion slot. The retention element is movably carried by the respective face panel so as to be movable between a first position and a second position. In the first position the retention element obstructs the open end of the respective mullion slot for vertically trapping one of the profile panel projections in the respective mullion slot and in the second position the retention element leaves the open end of the respective mullion slot unobstructed.

In some embodiments, the front panel and the rear panel are of differing construction, and opposed longitudinal ends of the rear panel are interengageable with one another so that a plurality of the rear panels can be connected end-to-end. When connected, the longitudinal ends of two adjacent rear panels form a rear panel junction slot therebetween. This rear panel junction slot is adapted to removably receive the longitudinal end of one of the profile panels. Similarly, opposed longitudinal ends of the front panel are interengageable with one another so that a plurality of the front panels can be connected end-to-end. When connected, the longitudinal ends of two adjacent front panels form a front panel junction slot therebetween. This front panel junction slot is adapted to removably receive the longitudinal end of one of the profile panels.

Optionally, the longitudinal ends of the front panels and the longitudinal ends of the rear panels are interengageable with one another so that the front panels and the rear panels can be connected end-to-end with a junction slot therebetween.

In some embodiments, each of the first slots is closed at an inferior end of the front panel and open at superior ends of the front panels, and each of the second slots is closed at inferior ends of the rear panels and open at superior ends of the rear panels.

In some embodiments, the longitudinal ends of the profile panels each comprise a longitudinally extending profile panel projection sized to fit removably within the first slots, the second slots and the junction slots, and at least one shoulder disposed inwardly of the profile panel projection. The shoulders are positioned to cooperate to longitudinally trap the profile panels between the front panel and the rear panel when the profile panel projections are received in the first and second slots.

In particular embodiments, each front panel has a first retention element associated with its first slot and each rear panel has a second retention element associated with its second slot. The first retention element and the second retention element are each movably carried by the respective front panel and rear panel so as to be movable between a first position and a second position. In the first position, the retention element obstructs the open end of the respective slot to vertically trap one of the profile panel projections in the respective slot, and in the second position the retention element leaves the open end of the respective slot unobstructed.

BRIEF DESCRIPTION OF THE DRAWINGS

These and other features will become more apparent from the following description in which reference is made to the appended drawings wherein.

DETAILED DESCRIPTION

Figure 1A:
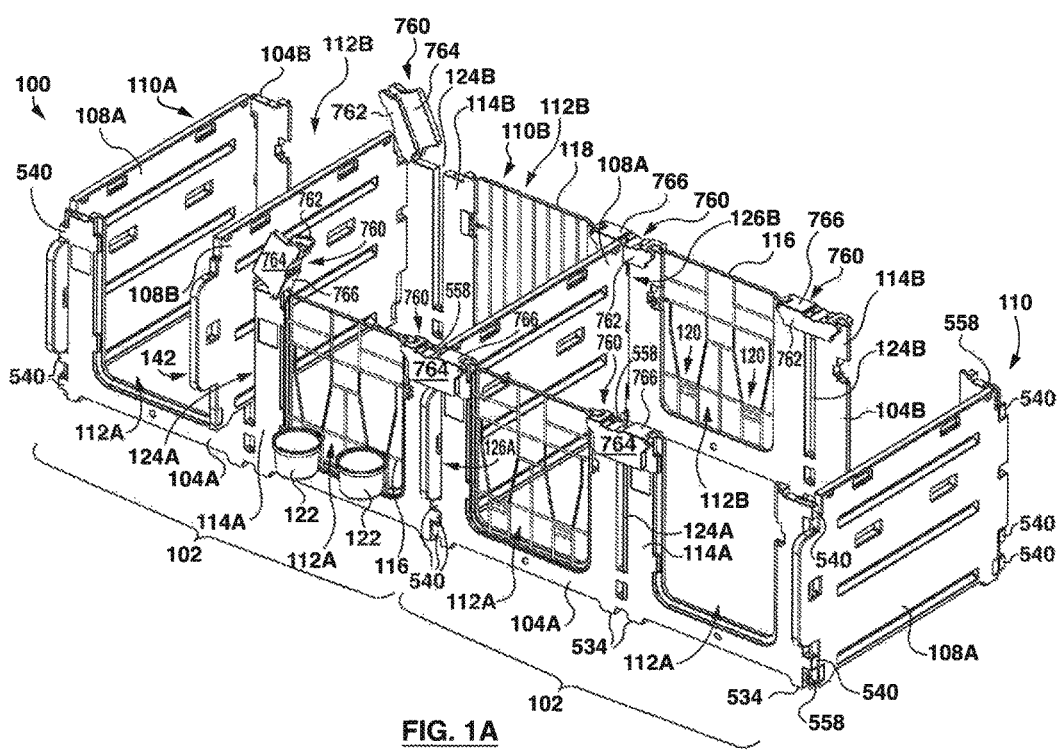
FIG. 1A is a top perspective view of a first exemplary modular animal pen system according to an aspect of the disclosure, showing installation and removal of a divider panel thereof.

Reference is first made to FIGS. 1A to 3, in which an exemplary modular animal pen system is indicated generally by reference 100. The animal pen system 100 is suitable for use with young animals that have recently been weaned from their mothers, although it may be used with older animals as well. The exemplary animal pen system 100 may be used to house bovine calves; animal pen systems according to the present disclosure may also be used with other animals including pigs, sheep and goats, for example.

The exemplary pen system 100 is modular, and each module 102 comprises a front panel 104A, a rear panel 104B and two opposed side panels 108A secured to and extending between the front panel 104A and the rear panel 104B to form an open-topped primary enclosure indicated generally by reference 110. The pen system 100 is intended primarily for indoor use and would rest on a generally planar floor of concrete, cement or other suitable material and as such the pen system 100 has an open bottom.

The exemplary embodiment of the pen system 100 shown in the Figures comprises two modules 102 joined end-to-end and sharing a common side panel 108A as will be described further below.

Figure 9:
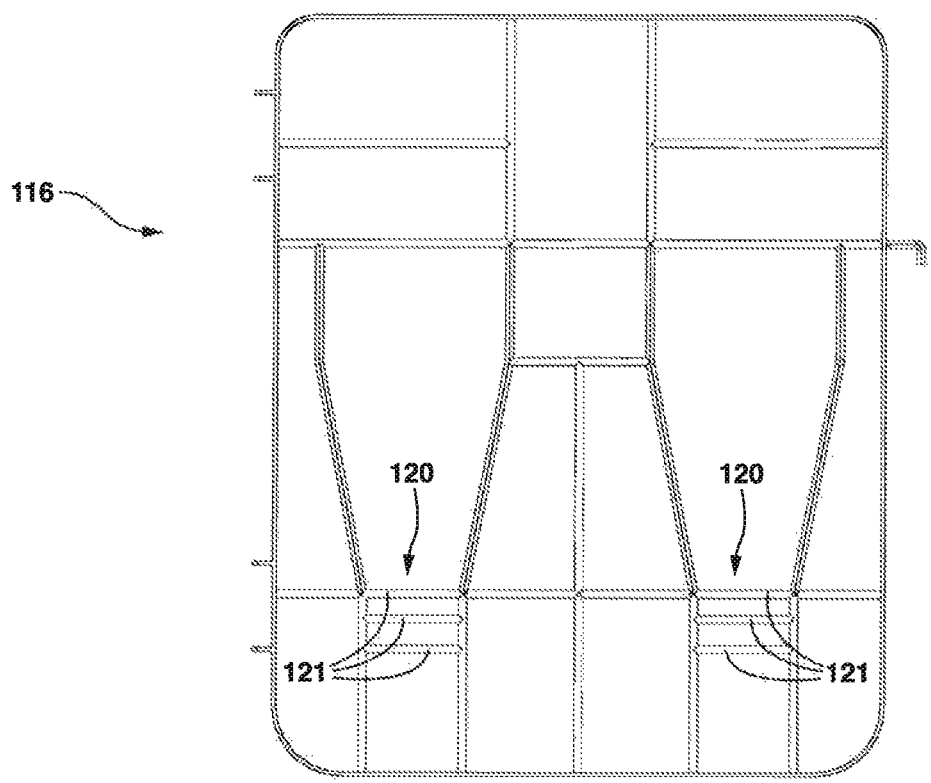
FIG. 9 shows an exemplary feeding gate for the animal pen system of FIG. 1A.
Figure 10:
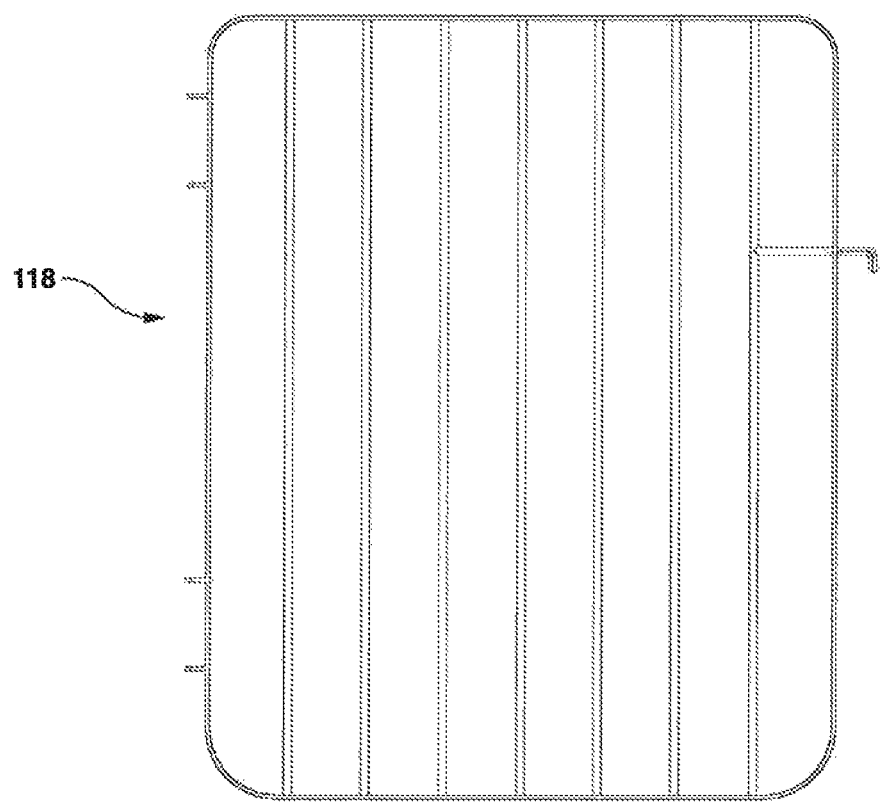
FIG. 10 shows an exemplary confinement gate for the animal pen system of FIG. 1A.
Figure 11:
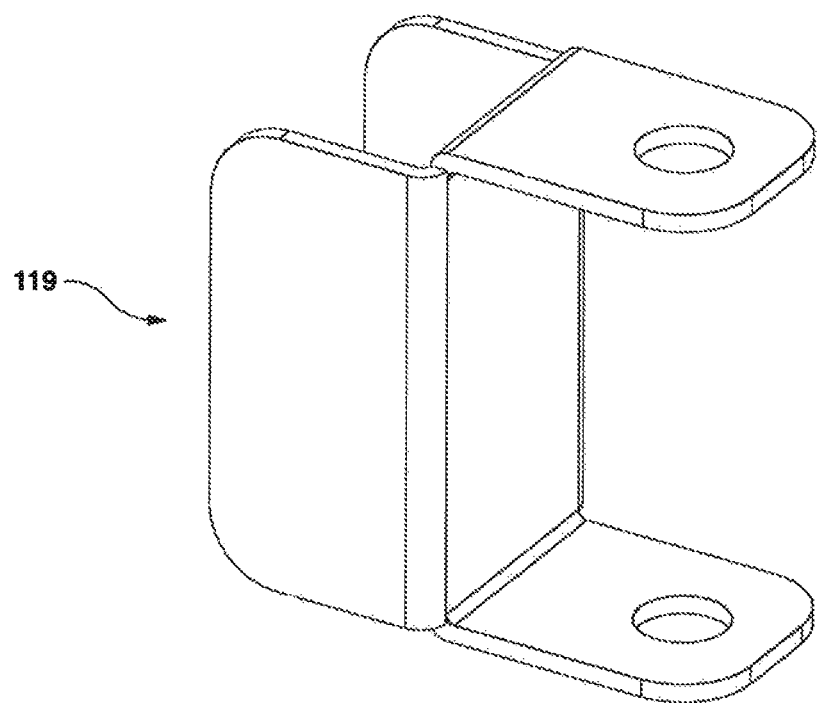
FIG. 11 shows an exemplary hinge bracket for the animal pen system of FIG. 1A.

The front panel 104A and the rear panel 104B of each module 102 each have two adjacent open-topped doorway apertures 112A, 112B, respectively, formed therein, with a respective mullion 114A, 114B disposed between the doorway apertures 112A, 112B. The doorway apertures 112A, 112B are adapted to receive respective selectively closable gates 116, 118, for example by hinging the gates 116, 118 to hinge brackets 119 (FIG. 11) secured on the front panel 104A and rear panel 104B, or by any other suitable technique. The front panel 104A and the rear panel 104B and the gates 116, 118 may be provided with suitable latching mechanisms. In the illustrated embodiment, two types of gate are shown: a feeding gate 116 which includes receptacles 120 for mounting buckets 122 for food and water, and a confinement gate 118. The positions of the feeding gate 116 and confinement gate 118 are interchangeable. FIGS. 9 and 10 show the feeding gate 116 and confinement gate 118, respectively, in more detail and FIG. 11 shows an exemplary hinge bracket 119. The receptacles 120 on the feeding gate 116 permit the height at which the buckets 122 are mounted to be adjusted. In particular, as shown in FIG. 9, the receptacles 120 comprise a series of vertically spaced crossbars 121, each of which can receive a bucket ring for supporting a bucket 122 (FIGS. 1A, 1B and 3), and the height of the bucket ring (and hence of the bucket 122) can be adjusted by mounting the bucket ring on a selected one of the crossbars 121. Other feeding options include bottle, milkbar, nipple bucket or even robotic feeding systems. Optionally two opposed feeding gates 116 may be used to double the feeding space and/or to support a robotic feeding system on one of the feeding gates 116 with food and water buckets 122 on the opposite feeding gate 116; this arrangement helps to avoid contamination of the food and water buckets 122 by the robotic feeding system.

The mullions 114A, 114B each have a vertically extending mullion slot 124A, 124B formed therethrough, and the front panel 104A and the rear panel 104B of each module 102 are arranged such that the mullion slots 124A, 124B are in registration with one another. Thus, the front panel 104A has a first slot 124A formed therethrough and the rear panel 104B has a second slot 124B formed therethrough, with the second slot 124B in registration with the first slot 124A.

Continuing to refer to FIGS. 1A to 3, each module 102 of the animal pen system 100 further comprises a removable divider panel 108B whose longitudinal ends 142, 144 are sized to fit removably within the mullion slots 124A, 124B. As can be seen in the Figures, when the divider panel 108B is positioned with its longitudinal ends 142, 144 within the mullion slots 124A, 124B, the divider panel 108B extends between the front panel 104A and the rear panel 104B so as to divide the primary enclosure 110 of that module 102 into two secondary enclosures 110A and 110B. The removable divider panel 108B allows for calves (or other young animals) to be housed individually, i.e. with a divider panel 108B installed, or grouped, i.e. with the divider panel 108B removed.

In the illustrated embodiment, the front panel 104A and the rear panel 104B of each module 102 each have two adjacent doorway apertures 112A, 112B and a single mullion 114A, 114B. In other embodiments, the front panel and the rear panel may have three doorway apertures and two mullions, four doorway apertures and three mullions, and so on, with each mullion having a slot for a divider panel.

Without promising any particular utility, where both the front panel 104A and the rear panel 104B have doorway apertures 112A, 112B, this arrangement may provide increased flexibility for adding bedding and feeding and may also facilitate improved airflow. In addition, embodiments in which both the front panel 104A and the rear panel 104B have doorway apertures 112A, 112B enable common components to be used. In the illustrated embodiment, both the front panel 104A and the rear panel 104B are formed by face panels 504 (FIGS. 5A and 5B) of identical construction so as to be interchangeable with one another. Similarly, in the illustrated embodiment the side panels 108A and the divider panels 108B are formed by profile panels 608 (FIGS. 6A to 6C) of identical construction so as to be interchangeable with one another. Thus, in one preferred embodiment, only two types of panel are used: face panels 504, which form the front panels 104A and the rear panels 104B, and profile panels 608, which form the side panels 108A and the divider panels 108B.

Figure 3:
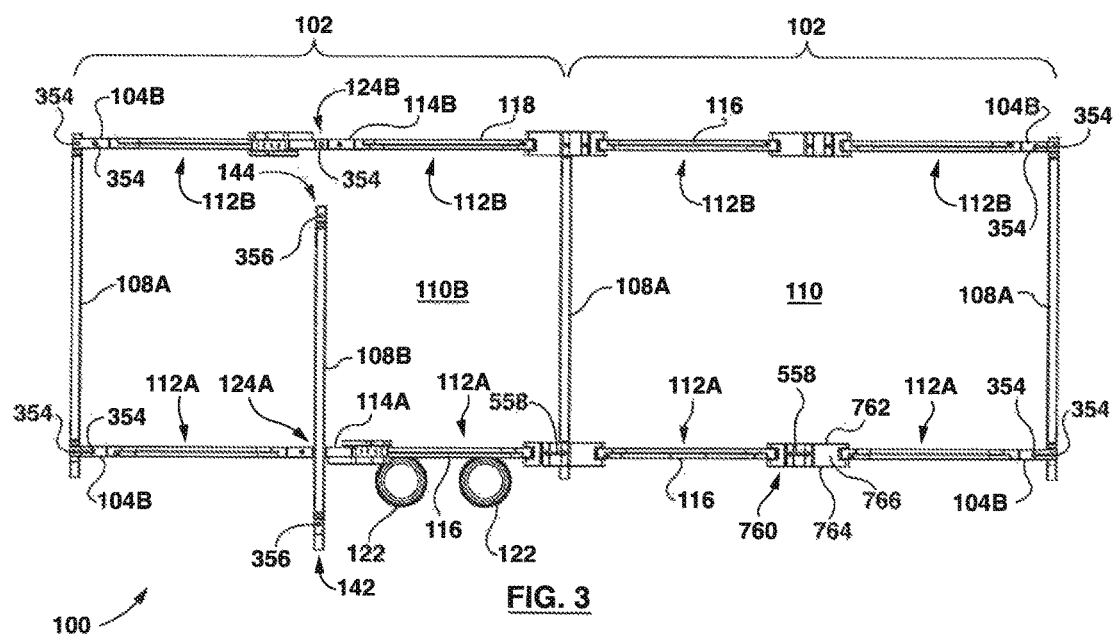
FIG. 3 is a top plan view of the animal pen system of FIG. 1A.

In a particularly preferred embodiment, as best seen in FIGS. 1 to 3, the face panels 504, that is, the front panels 104A and the rear panels 104B, can be connected end-to-end to join multiple modules 102 together. Any arbitrary number of modules 102 can be joined together end-to-end to create a calf pen system of any desired extent. When the face panels 504 are so joined, junction slots 126A, 126B are formed between the adjacent front panels 104A and the adjacent rear panels 104B, respectively; the junction slots 126A, 126B are in registration with one another and each junction slot 126A, 126B is adapted to removably receive one of the longitudinal ends of one of the profile panels 608. Thus, the individual modules 102 can be separated from one another by a profile panel 608; alternatively the profile panel 608 may be omitted or removed so as to combine the enclosures 110 of two or more adjacent modules 102 into a single aggregate enclosure.

Figure 5A:
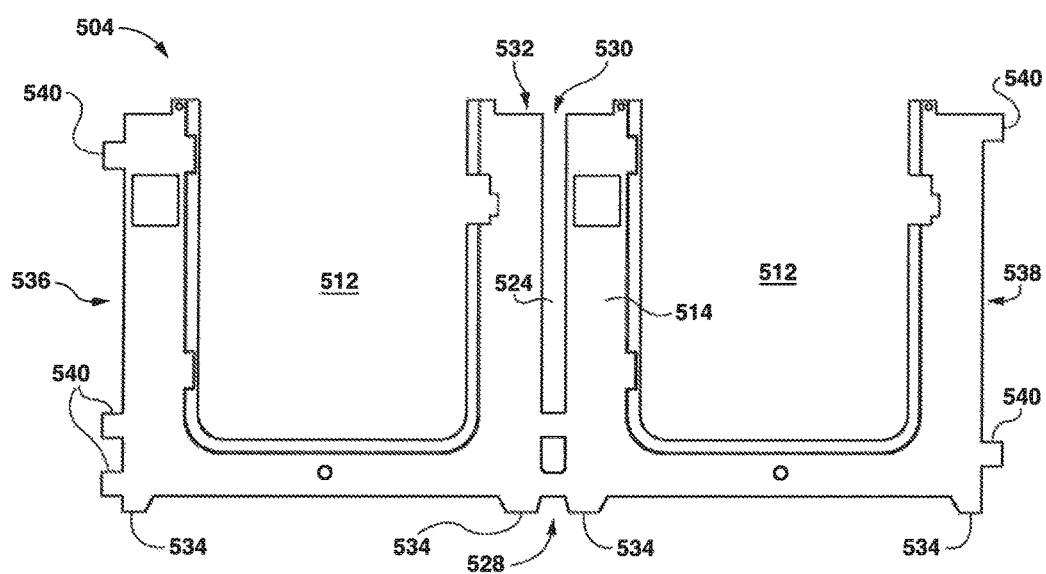
FIG. 5A is a front elevation view of an exemplary face panel for the animal pen system of FIG. 1A.
Figure 5B:
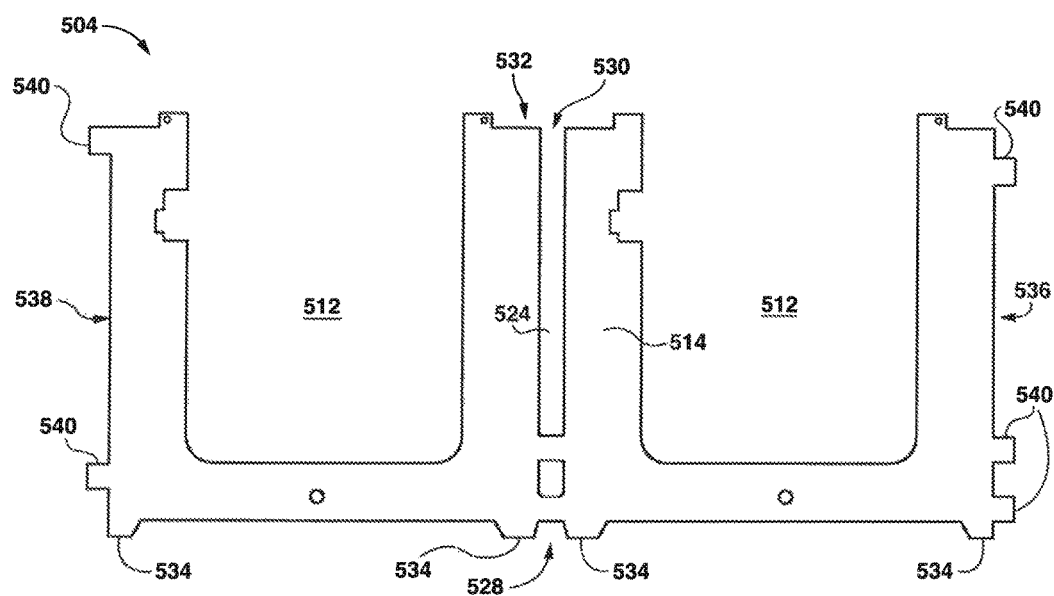
FIG. 5B is a rear elevation view of the face panel of FIG. 5A.

Reference is now made to FIGS. 5A and 5B, in which an exemplary face panel 504 is shown in more detail. As noted above, the face panel 504 can be used as either the front panel 104A or the rear panel 104B, and as such has two adjacent doorway apertures 512 separated by a mullion 514 with a mullion slot 524 formed therethrough. In the illustrated embodiment, the mullion slot 524 of each face panel 504 is closed at the inferior end 528 of the mullion 524 and has an open end 530 at the superior end 532 of the mullion 524. The face panel 504 includes a plurality of feet 534 for supporting the face panel 504 on a surface.

Figure 5C:
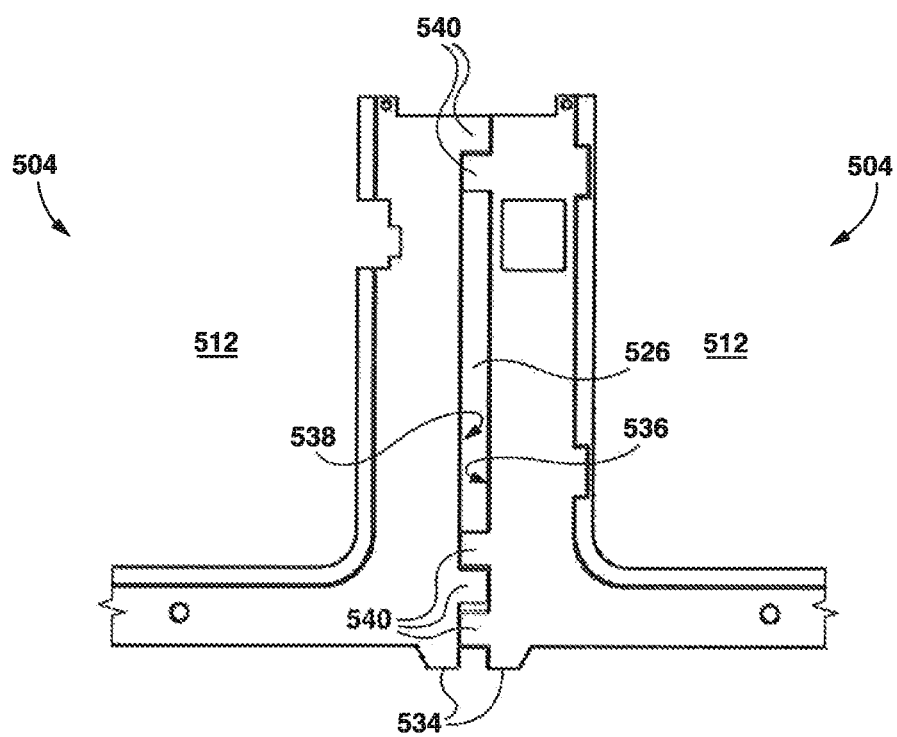
FIG. 5C shows end-to-end interconnection of two instances of the face panel of FIG. 5A.

As described above, the face panels 504 can be connected end-to-end to join multiple modules 102 together and to achieve this, the opposed longitudinal ends 536, 538 of the face panels 504 are interengageable with one another. In the illustrated embodiment, interengagement is achieved by way of complementary fingers 540; FIG. 5C shows the longitudinal ends 536, 538 of the face panels 504 interengaged with the junction slot 526 formed between the opposed longitudinal ends 536, 538 of the adjacent face panels 504. The complementary fingers 540 represent merely one exemplary configuration by which the longitudinal ends 536, 538 of the face panels 504 may be interengaged; other configurations are also contemplated.

Figure 6A:
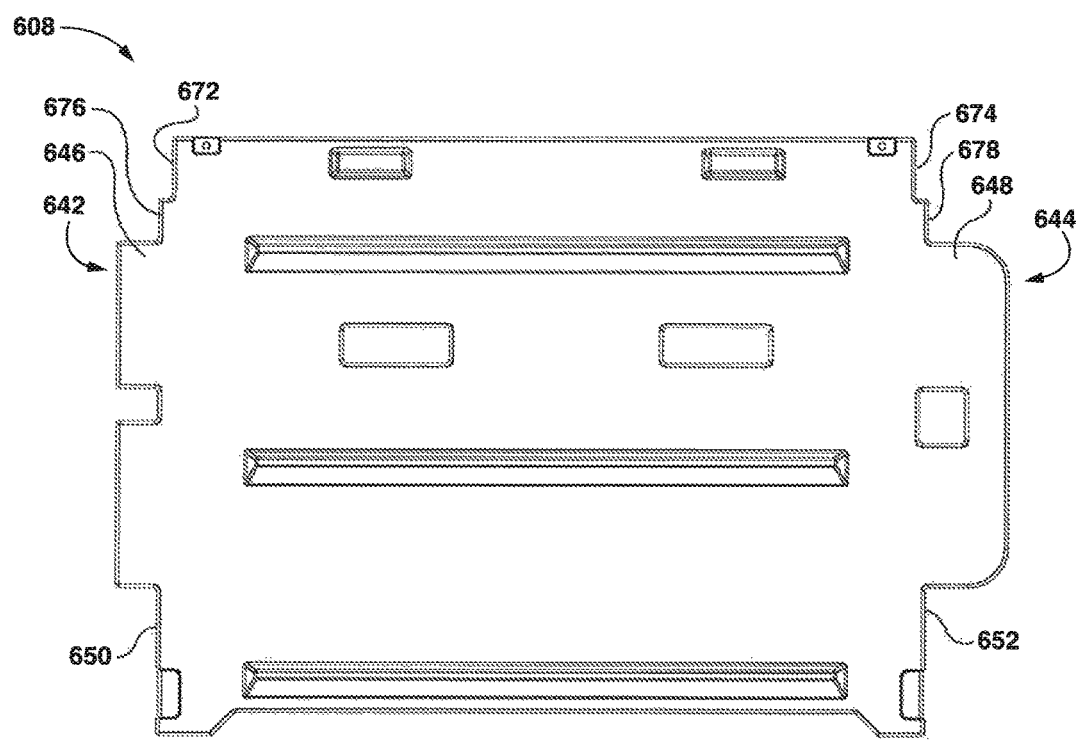
FIG. 6A is a side elevation view of a first exemplary profile panel for the animal pen system of FIG. 1A.
Figure 6B:
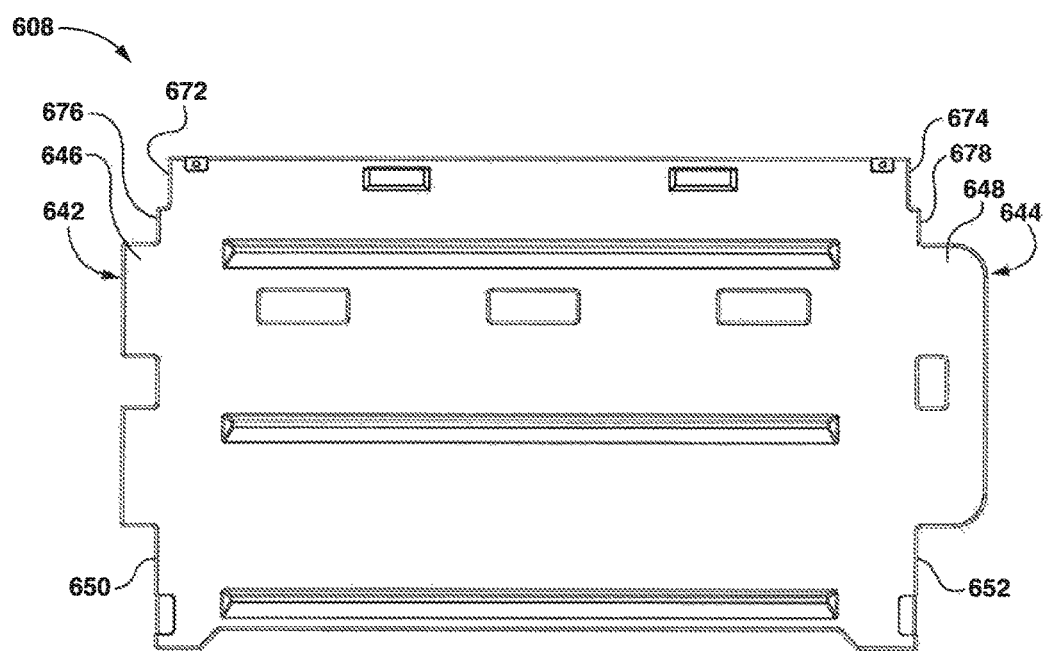
FIG. 6B is a side elevation view of a second exemplary profile panel for the animal pen system of FIG. 1A.
Figure 6C:
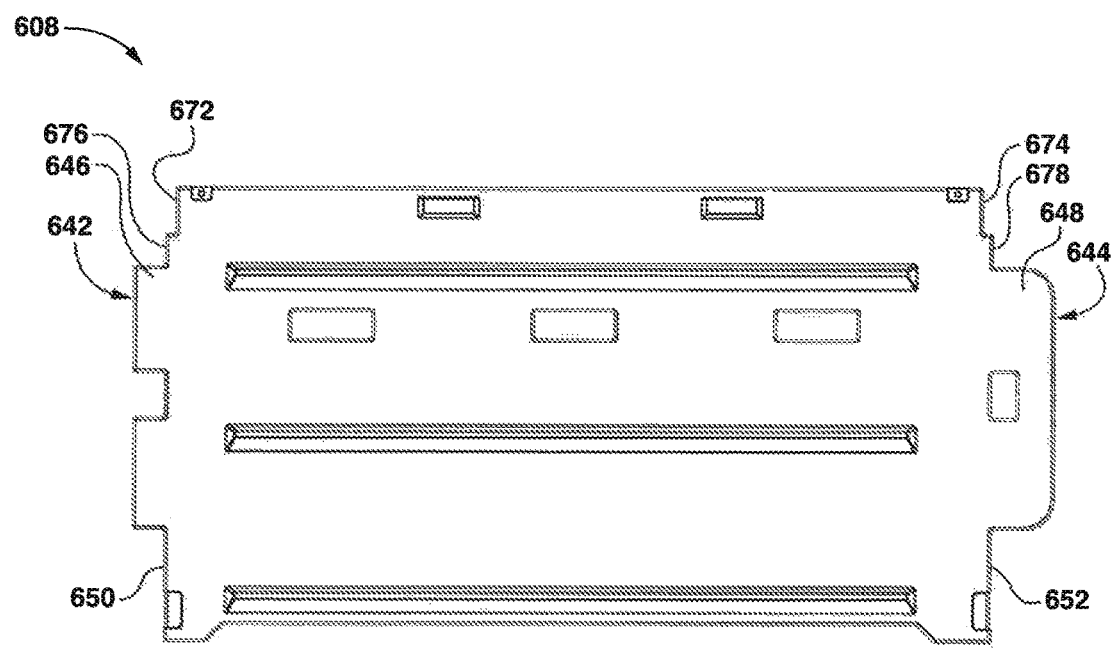
FIG. 6C is a side elevation view of a third exemplary profile panel for the animal pen system of FIG. 1A.

Reference is now made to FIGS. 6A to 6C, which show several exemplary profile panels 608 of different lengths; by appropriately selecting the length of the profile panels 608 the size of the enclosures 110 can be adjusted to accommodate different types of animals. FIG. 6A shows a 5' profile panel 608, FIG. 6B shows a 6' profile panel 608 and FIG. 6C shows a 7' profile panel 608; these lengths are merely exemplary and the profile panels 608 may be of any suitable length. For example, and without limitation, a profile panel may be shorter than those shown, e.g. 4' in length, or longer than those shown, e.g. 8' in length. The profile panels shown in FIGS. 6A to 6C differ from one another essentially only in their length and thus like reference numerals are used to refer to like features across FIGS. 6A to 6C.

As can be seen in FIGS. 6A to 6C, the opposed longitudinal ends 642, 644 of the profile panels 608 each comprise a respective longitudinally extending profile panel projection 646, 648 sized to fit removably within the mullion slots 124A, 124B, 524 and the junction slots 126A, 126B, 526 and a respective inferior shoulder 650, 652 disposed inwardly and inferiorly of the profile panel projection 646, 648. The inferior shoulders 650, 652 are positioned so as to cooperate to longitudinally trap the profile panels 608 between the front panel 104A and the rear panel 104B when the profile panel projections 646, 648 are received in the mullion slots 124A, 124B, 524 or the junction slots 126A, 126B, 526. More particularly, in the illustrated embodiment the inferior shoulders 650, 652 will engage the inner surface of the inferior end 528 of the mullion 524 or the inner surfaces of the lower fingers 540 to resist longitudinal movement of the profile panel 608.

Figure 8:
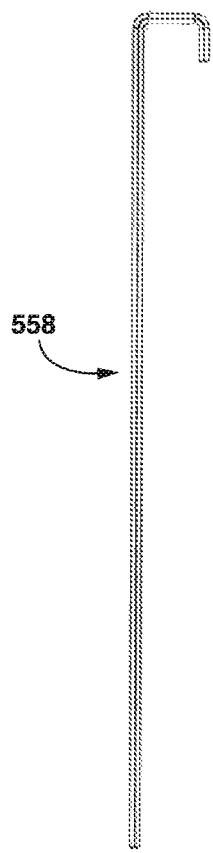
FIG. 8 shows an exemplary J-shaped rod.

The profile panels 608 can be secured to the face panels 504 by, for example, a rod-and-aperture system. Vertically aligned apertures 354 (FIG. 3) are formed through the fingers 540 and the inferior end 528 of the mullion 524 on the face panels 504, and vertically aligned apertures 356 (FIG. 3) are similarly formed through the profile panel projections 646, 648 on the profile panels 608, for example by drilling. When the profile panel projections 646, 648 are received in the mullion slots 124A, 124B, 524 or the junction slots 126A, 126B, 526, the apertures 354, 356 are in registration with one another so that a rod, such as the J-shaped rod 558 shown in FIG. 8, can be passed through the apertures 354, 356 to fasten the profile panels 608 to the face panels 504, or to fasten two face panels 504 together end-to-end (with or without a profile panel 608).

As noted above, in the illustrated embodiment the mullion slots 124A, 124B, 524 are closed at the inferior ends 528 of the mullions 524 and have open ends 530 at the superior ends 532 of the mullions 524. As best seen in FIGS. 1A to 3, in a preferred embodiment, each face panel 104A, 104B has a retention element 760 associated with each mullion slot 124A, 124B. The retention element 760 is movably carried by the respective face panel 104A, 104B so as to be movable between a first position, shown on the right side of FIGS. 1A, 1B, 2A and 3 and on the left side of FIG. 2B, and a second position, shown on the left side of FIGS. 1A, 1B, 2A and 3 and on the left side of FIG. 2B. In the first position, the retention element 760 obstructs the open end 530 of the respective mullion slot 124A, 124B and thereby vertically traps the respective profile panel projection 646, 648 in the respective mullion slot 124A, 124B. In the second position, the retention element 760 leaves the open end 530 of the respective mullion slot 124A, 124B unobstructed. In the illustrated embodiment, the retention element 760 is pivotally carried at a superior edge of the face panel 104A, 104B and rotates between the first position and the second position.

Figure 7A:
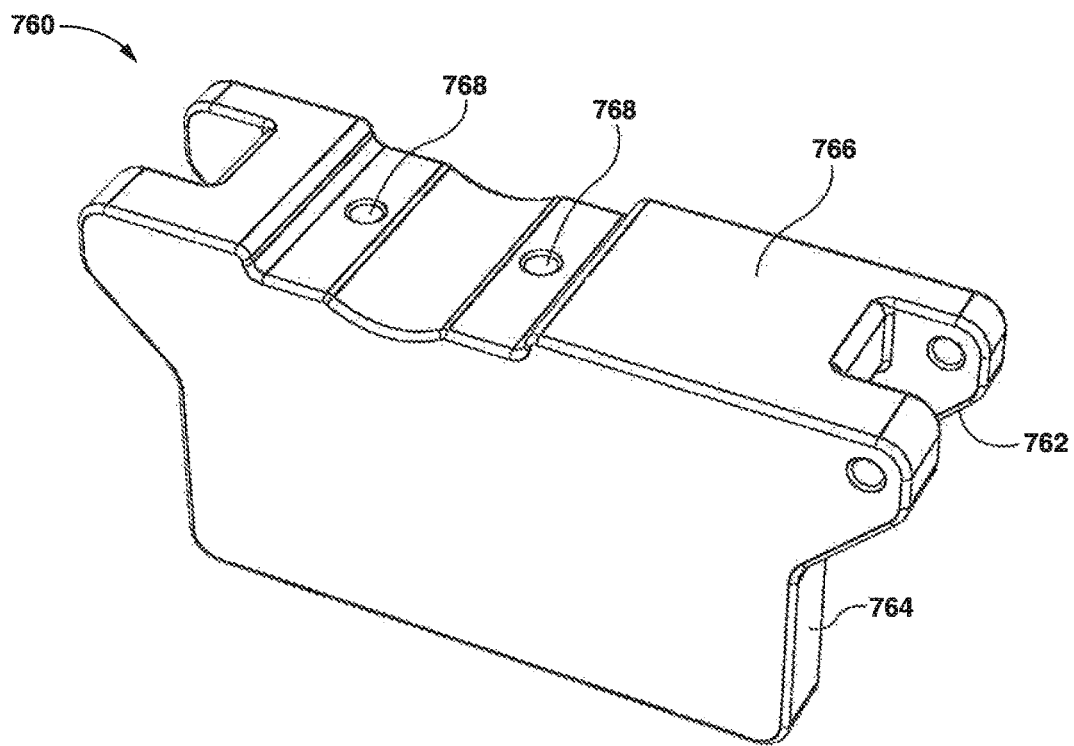
FIG. 7A is a top perspective view of an exemplary retention element for the animal pen system of FIG. 1A.
Figure 7B:
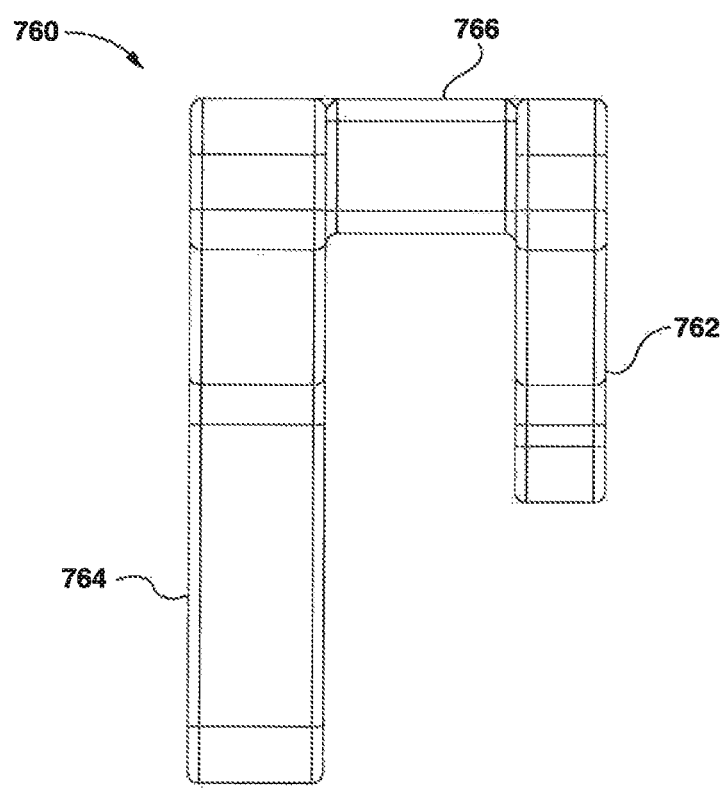
FIG. 7B is a side elevation view of the retention element of FIG. 7A.
Figure 7C:
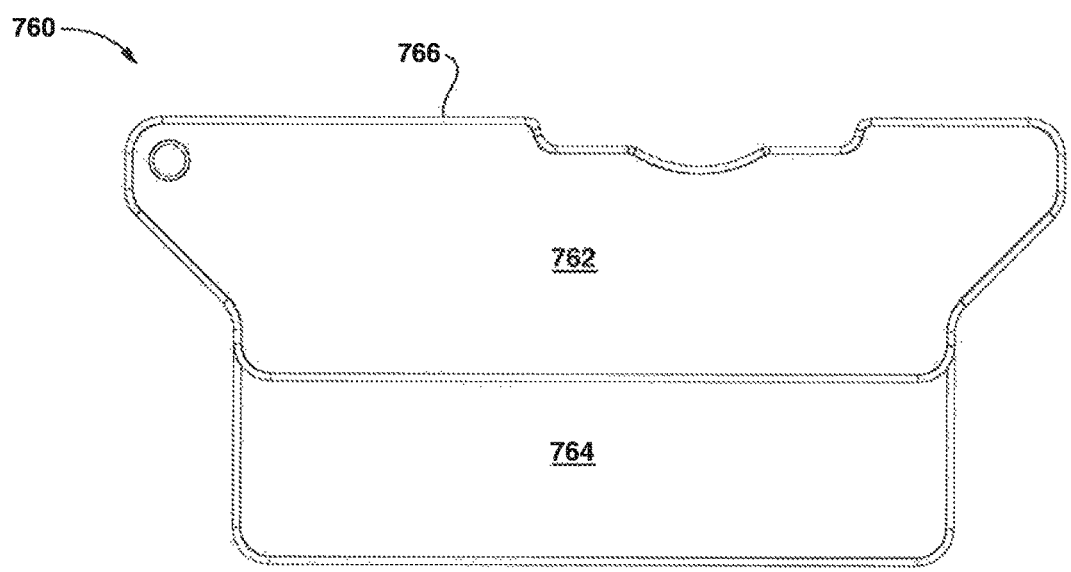
FIG. 7C is a front elevation view of the retention element of FIG. 7A.
Figure 7D:
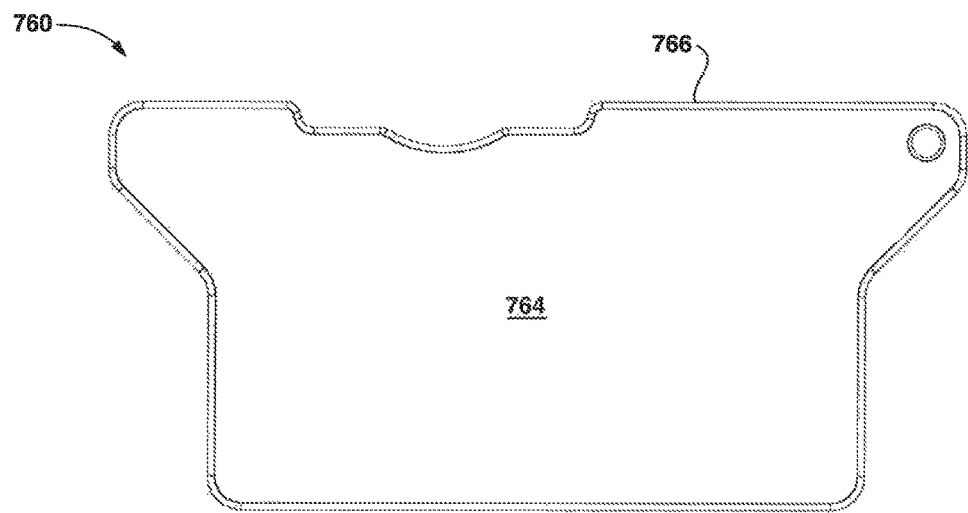
FIG. 7D is a rear elevation view of the retention element of FIG. 7A.

FIGS. 7A to 7D show various views of the exemplary retention element 760 which, as seen in FIG. 7B, has a generally inverted J-shaped profile comprising a relatively shorter projection 762 and a relatively longer projection 764 spaced apart by and depending from a superior web 766 so as to straddle the width of the superior edge of the face panel 104A, 104B, 504 when the retention element 760 is in the first position. As seen in FIG. 7A, apertures 768 are formed through the superior web 770 of the retention element 760 to accommodate the rod (e.g. the J-shaped rod 558 shown in FIG. 8). As such, each face panel 104A, 104B may have two retention elements, one associated with the mullion 124A, 124B and another at one end of the face panel 104A, 104B to assist in connecting the modules 102 end-to-end, as shown in FIGS. 1 to 3.

Referring again to FIGS. 6A to 6C, the opposed longitudinal ends 642, 644 of the profile panels 608 each further comprise a respective superior shoulder 672, 674 disposed inwardly and superiorly of the profile panel projection 646, 648. When the retention element 760 is in the first position, the superior shoulders 672, 674 will engage the relatively shorter projections 762 of the retention elements 760 to resist longitudinal movement of the profile panel 608 and thereby longitudinally trap the profile panels 608 between the front panel 104A and the rear panel 104B when the profile panel projections 646, 648 are received in the mullion slots 124A, 124B, 524 or the junction slots 126A, 126B, 526.

In the illustrated embodiment, the opposed longitudinal ends 642, 644 of the profile panels 608 each further comprise a respective intermediate shoulder 676, 678 disposed inwardly and superiorly of the profile panel projection 646, 648 and inferiorly of the respective superior shoulder 672, 674. When the retention element 760 is in the first position, the intermediate shoulders 676, 678 will extend beyond the relatively shorter projections 762 of the retention elements 760 and, when the profile panel 608 is used as a side panel, the intermediate shoulders 676, 678 will engage the fingers 540 of the face panels 504 to further resist longitudinal movement of the profile panel 608.

Figure 1B:
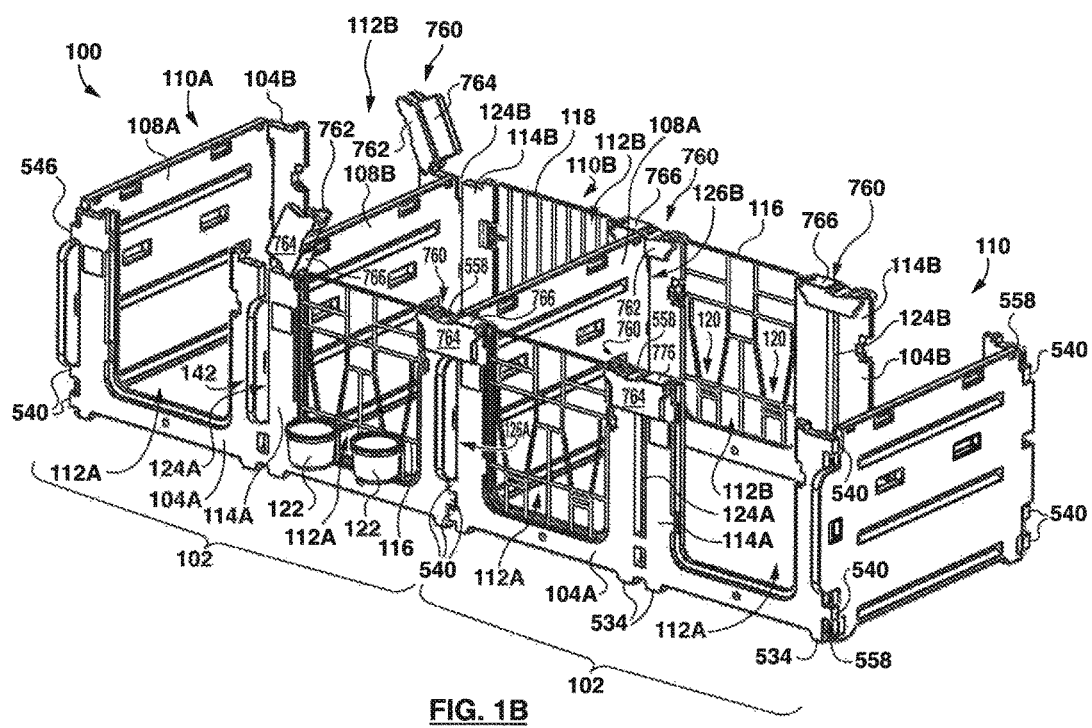
FIG. 1B is a top perspective view of the animal pen system of FIG. 1A, with the divider panel thereof installed.
Figure 2A:
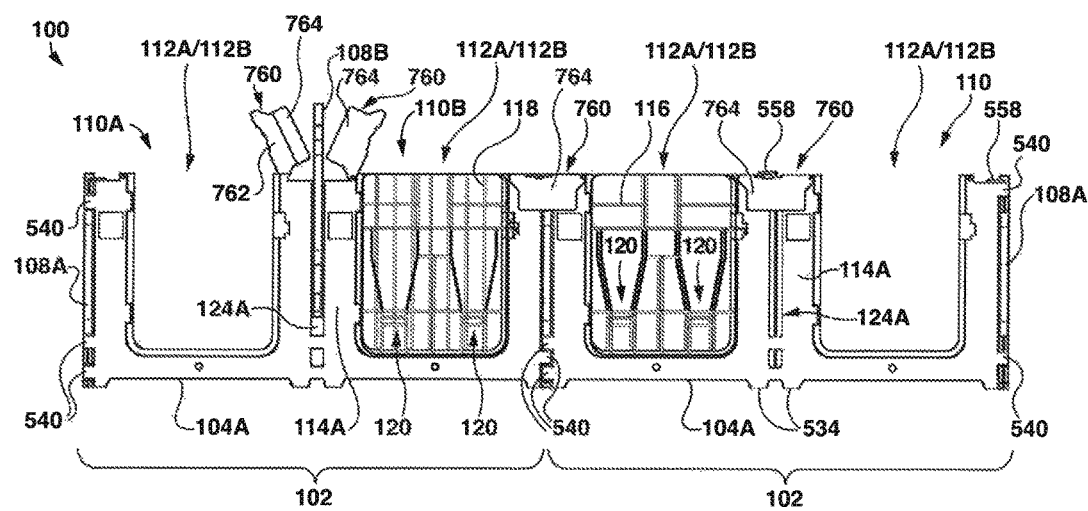
FIG. 2A is a front elevation view of the animal pen system of FIG. 1A.
Figure 2B:
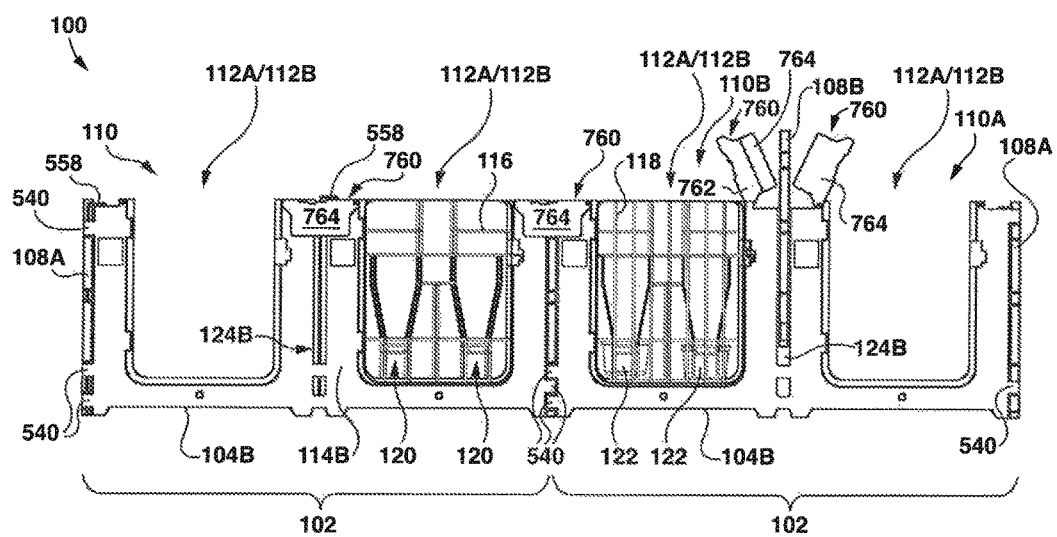
FIG. 2B is a rear elevation view of the animal pen system of FIG. 1A.
Figure 4:
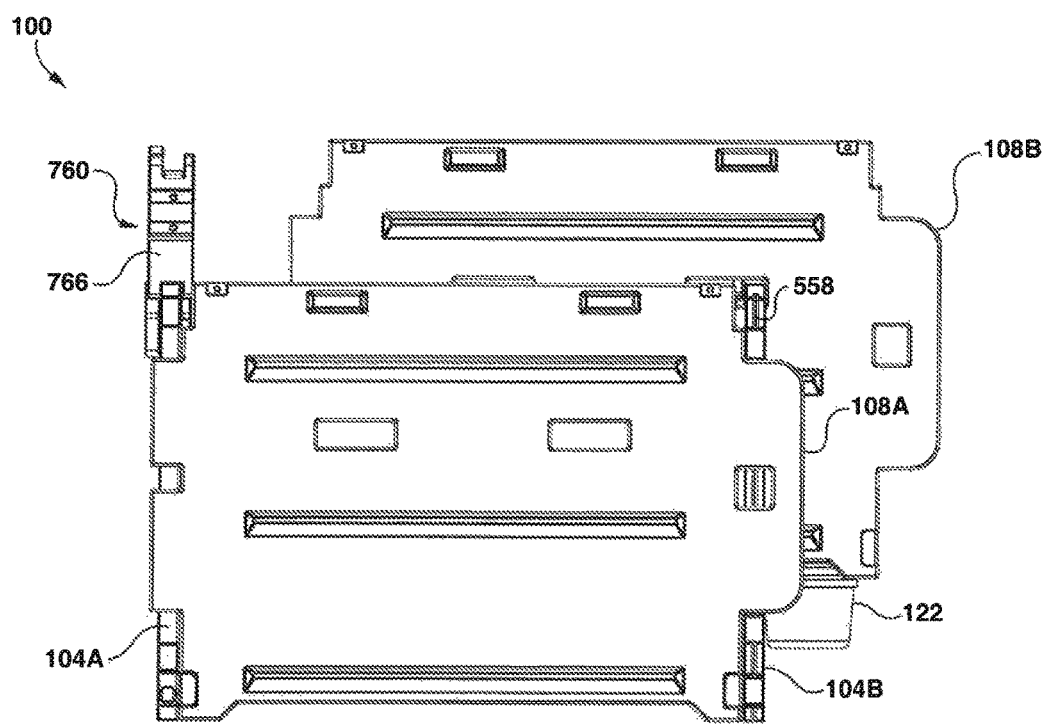
FIG. 4 is a side elevation view of the animal pen system of FIG. 1A.

Reference is now made specifically to FIGS. 1A and 1B, as well as FIG. 4. As noted above, each module 102 of the animal pen system 100 comprises a removable divider panel 108B (e.g. a profile panel 608) whose longitudinal ends 142, 144 are sized to fit removably within the mullion slots 124A, 124B to divide the primary enclosure 110 of that module 102 into two 110A and 110B. The removable divider panel 108B allows for calves (or other young animals) to initially be housed individually, i.e. with a divider panel 108B installed, as shown on the left side of FIG. 1B, or grouped, i.e. with the divider panel 108B removed, as shown on the right side of FIG. 1B.

To install a divider panel 108B, the J-shaped rods 558 are removed and the retention elements 760 associated with the mullions 114A, 114B that will receive the divider panel 108B are moved to the second position so as to leave the open end 530 of the respective mullion slot 124A, 124B unobstructed. The divider panel 108B can then be slid longitudinally through one of the mullion slots 124A, 124B until the profile panel projections 646, 648 are positioned in the mullion slots 124A, 124B, and then slid downwardly so that the inferior shoulders 650, 652 trap the divider panel 108B between the front panel 104A and the rear panel 104B. The retention elements 760 are then moved to the first position to obstruct the open end 530 of the respective mullion slot 124A, 124B and vertically trap the profile panel projections 646, 648 in the respective mullion slot 124A, 124B. The J-shaped rods 558 can then be reinserted through the apertures 768 in the retention element into the vertically aligned apertures 354, 356. To remove a divider panel 108B, the process is reversed. FIG. 4 and the left side of FIG. 1A show how a divider panel 108B can be inserted or withdrawn.

A similar process can be used to install or remove a side panel 108A, except with the additional step of separating the adjacent front panels 104A and rear panels 104B and disengaging the complementary fingers 540. This permits the side panel 108A to be slid into or out of position between the adjacent front panels 104A and rear panels 104B. Once the side panel has been inserted or removed, the adjacent front panels 104A and rear panels 104B are moved back together and the complementary fingers 540 are re-engaged; where a side panel 108A has been inserted its profile panel projections 646, 648 will then be horizontally trapped in the junction slot 126.

Animals (e.g. calves) can be housed individually by using the side panels 108A and divider panels 108B to separate them and then grouped as required by removing one or more side panels 108A and/or divider panels 108B; one or more animals can also be isolated (e.g. for health reasons) by re-installing one or more side panels 108A and/or divider panels 108B. As noted above, any arbitrary number of modules 102 can be joined together end-to-end to create a calf pen system of any desired extent; by installing or removing one or more side panels 108A and/or divider panels 108B, the calf pen system can be subdivided into a variety of different enclosure configurations.

In the above-described embodiment, only two types of panel are used: face panels, which form both the front panels and the rear panels, and profile panels, which form both the side panels and the divider panels. In other embodiments, the front and rear panels may be of differing design and construction.

Figure 12A:
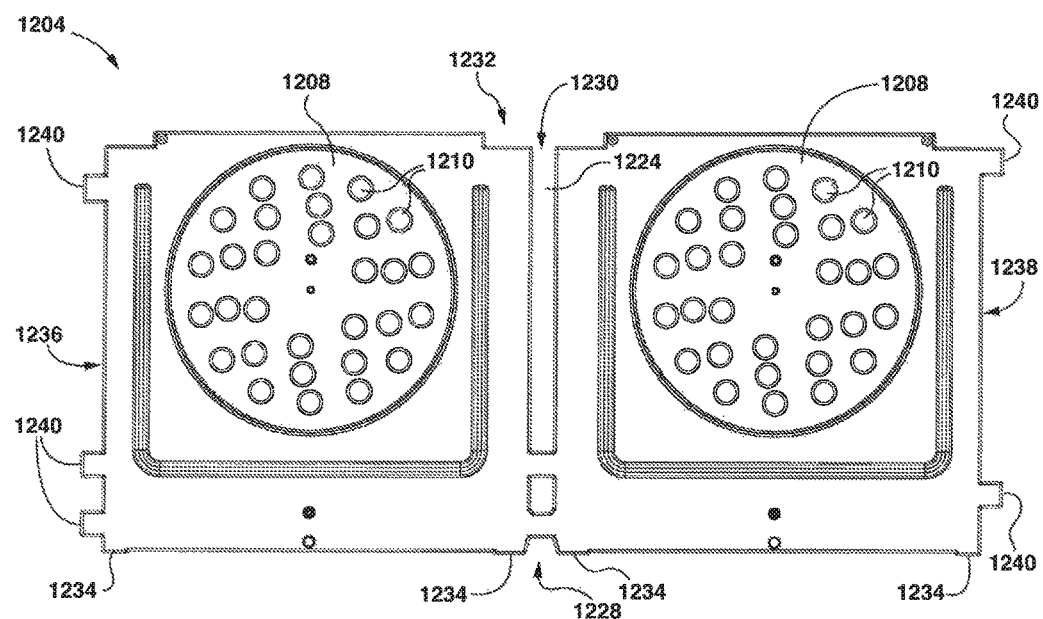
FIG. 12A is a front elevation view of an exemplary alternate rear panel for the animal pen system of FIG. 1A.
Figure 12B:
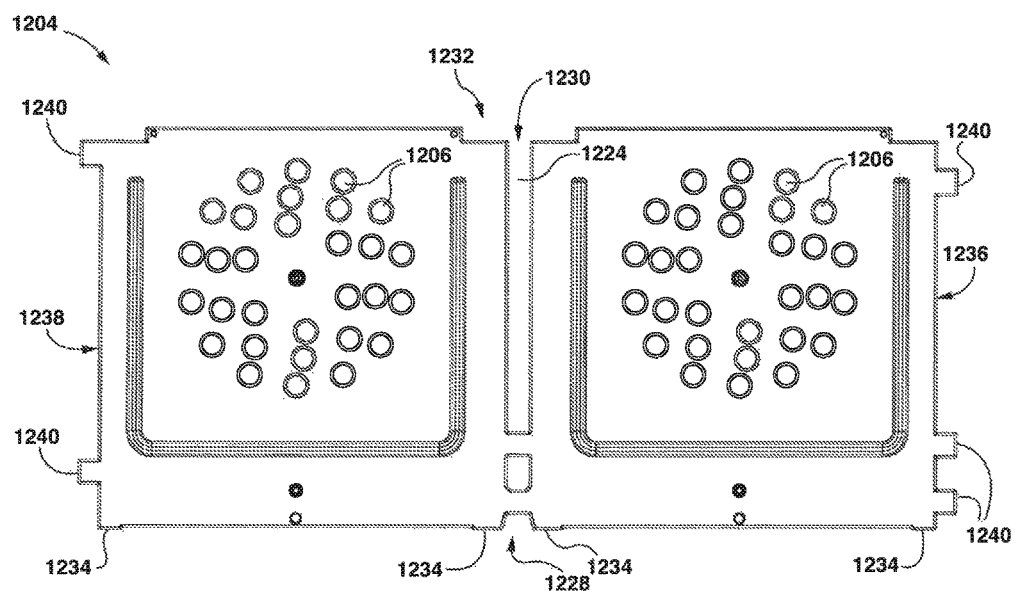
FIG. 12B is a rear elevation view of the alternate rear panel of FIG. 12A.

For example, in some embodiments only the front panel may have doorway apertures and the rear panel may simply be provided with one or more slots for the divider panel(s), and may optionally be provided with additional ventilation features. For example, FIGS. 12A and 12B show an exemplary alternative rear panel 1204 incorporating a rotary vent, in which features corresponding to those of the exemplary face panel 504 are indicated with identical reference numerals, except with the prefix "12" instead of "5". The alternative rear panel 1204 has a plurality of ventilation apertures 1206 formed therethrough and on which a vent cover 1208 (FIG. 12A) having a plurality of vent cover apertures 1210 is rotatably mounted. The vent cover 1208 is mounted on what will be the exterior of the alternative rear panel 1206. By rotating the vent cover 1208 relative to the alternative rear panel 1204, one or more of the vent cover apertures 1210 can be moved into and out of registration with one or more corresponding ventilation apertures 1206 in the alternative rear panel 1204 to provide a desired amount of ventilation. The rear panels 1204 each include a slot 1224 that is closed at the inferior end 1228 of the rear panel 1204 and has an open end 1230 at the superior end 1232 of the rear panel 1204; this slot 1224 is adapted to receive one of the profile panels 608 described above or one of the profile panels 1308 described below. Similarly to the face panels 504, opposed longitudinal ends 1236, 1238 of the rear panels 1204 are interengageable with one another so that the rear panels 1204 can be connected end-to-end and, when connected, the longitudinal ends 1236, 1238 of two adjacent rear panels form a rear panel junction slot (not shown) therebetween. The rear panel junction slot is adapted to removably receive one of the profile panels 608 described above or one of the profile panels 1308 described below. In embodiments that incorporate the rear panels 1204, the face panels 504 may serve as front panels, and are interengageable with one another end-to-end to form front panel junction slots and can receive the profile panels 608 as described above (or alternatively one of the profile panels 1308 described below). The exemplary rear panels 1204 can also incorporate a retention element such as the exemplary retention element 760 described above.

Where the front and rear panels are of differing construction, it is only necessary that each type of panel be interengeagable for end-to-end connection with panels of that type so as to form a junction slot therebetween. Although preferable, it is not necessary that front panels be interengageable with rear panels.

Figure 13A:
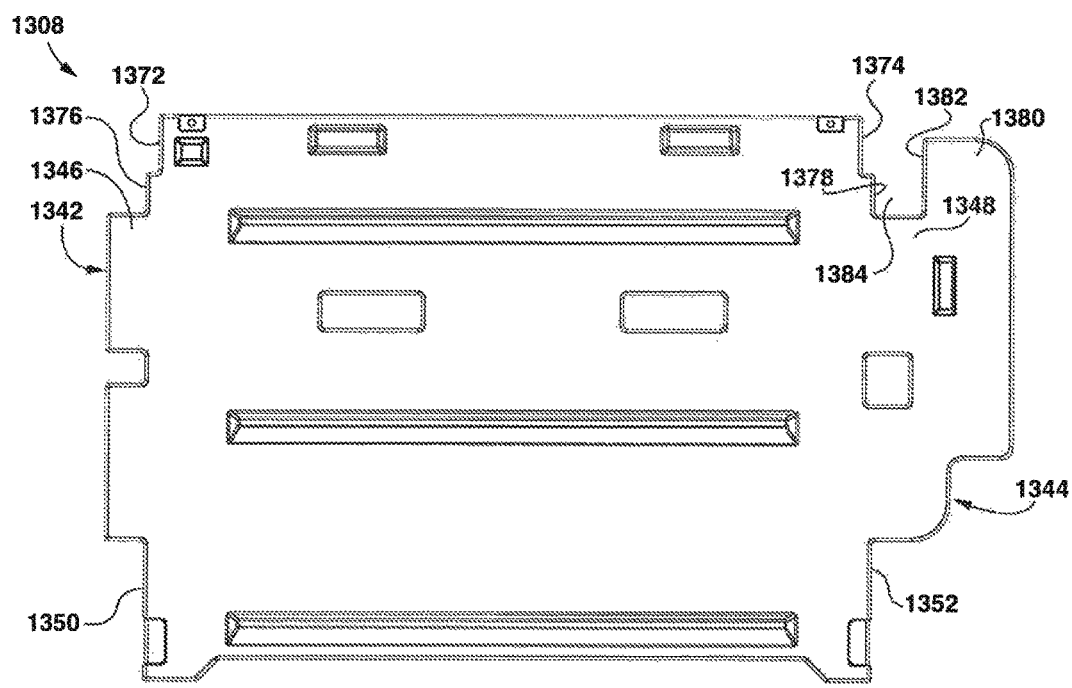
FIG. 13A is a side elevation view of a fourth exemplary profile panel for the animal pen system of FIG. 1A.
Figure 13B:
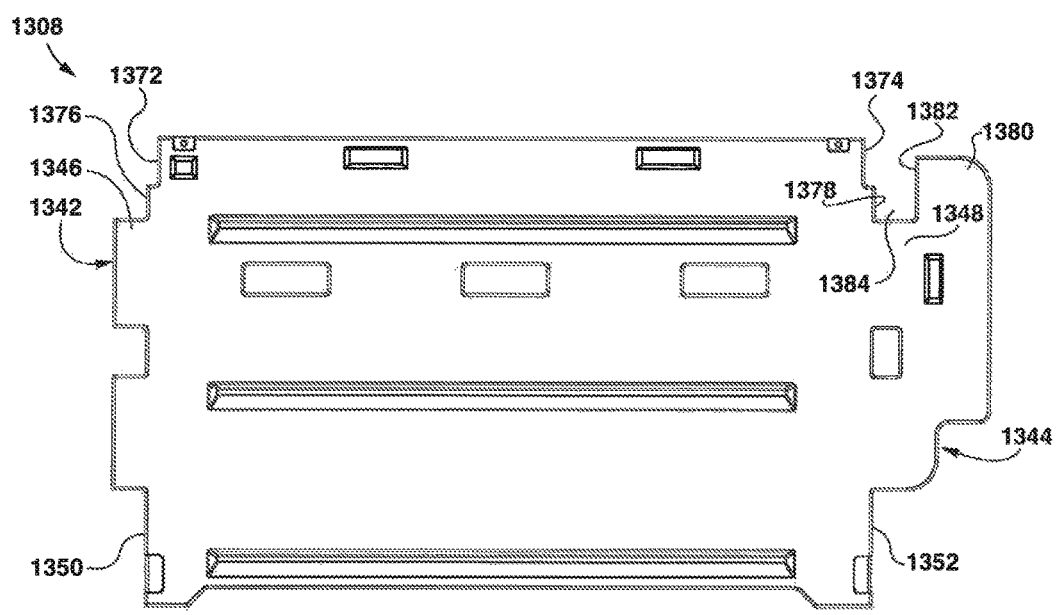
FIG. 13B is a side elevation view of a fifth exemplary profile panel for the animal pen system of FIG. 1A.
Figure 13C:
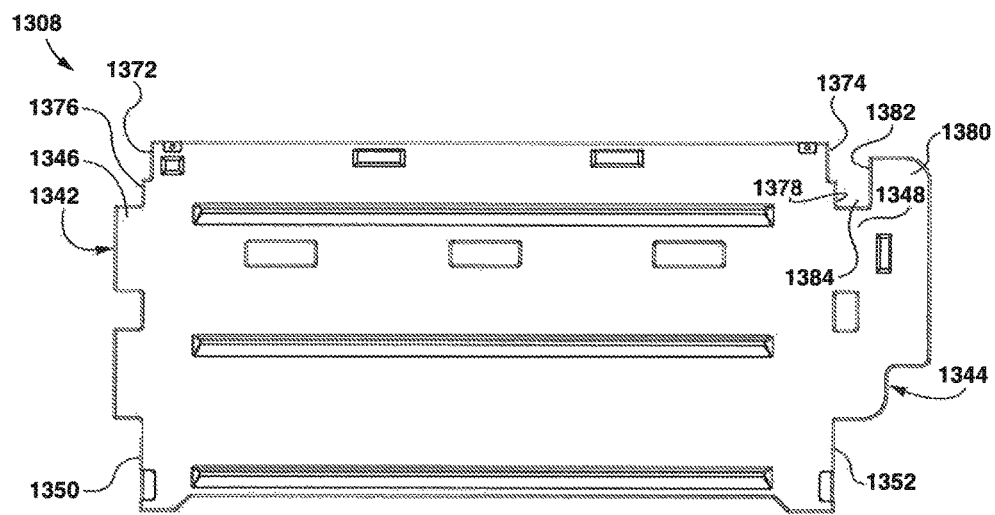
FIG. 13C is a side elevation view of a sixth exemplary profile panel for the animal pen system of FIG. 1A.

In some cases, the animals contained in the pen system 100 may attempt to make contact with one another despite the profile panels 608, for example by sticking their heads through the feeding gates 116 and extending their heads past the front profile panel projection 648. To inhibit this, the profile panels may be provided with a partition extension element extending outwardly and upwardly from the front profile panel projection. FIGS. 13A, 13B and 13C show alternate embodiments of profile panels 1308 which each include such a partition extension element. The alternate profile panels 1308 shown in FIGS. 13A to 13C are generally similar to the profile panels 608 shown in FIGS. 6A to 6C, with like reference numerals denoting like features except with the prefix "13" instead of "6". Thus, the longitudinal ends 1342, 1344 of the profile panels 1308 each comprise a respective longitudinally extending profile panel projection 1346, 1348, sized to fit removably within the slots 524 in the face panels 504, within the slots 1224 in the rear panels 1204, and within the junction slots (e.g. junction slots 126A, 126B, 526 and the junction slots between interengaged rear panels 1204). FIG. 13A shows a 5' profile panel 1308, FIG. 13B shows a 6' profile panel 1308 and FIG. 13C shows a 7' profile panel 1308; these lengths are merely exemplary and the profile panels 1308 may be of any suitable length.

The alternate profile panels 1308 each include a partition extension element 1380 extending outwardly and upwardly from the front profile panel projection 1348. The interior edge 1382 of the partition extension element 1380, i.e. the inner edge of the portion of the partition extension element 1380 that extends beyond the front panel projection 1348, is spaced from the front superior shoulder 1374 and front intermediate shoulder 1378 so as to form a recess 1384 which can receive the retention element 760. The shoulders 1374, 1378 are positioned to cooperate to longitudinally trap the profile panels 1308 between the front panel (e.g. face panel 504) and the rear panel (e.g. face panel 504 or rear panel 1204) when the profile panel projections 1346, 1348 are received in the slots 524, 1224, 126A, 126B, 526, etc. The alternate profile panels 1308 can be secured to the face panels 504 and/or the rear panels 1204 by, for example, the same rod-and-aperture system described above, and can accommodate a retention element, for example the same exemplary retention element 760 described above.

Figure 14:
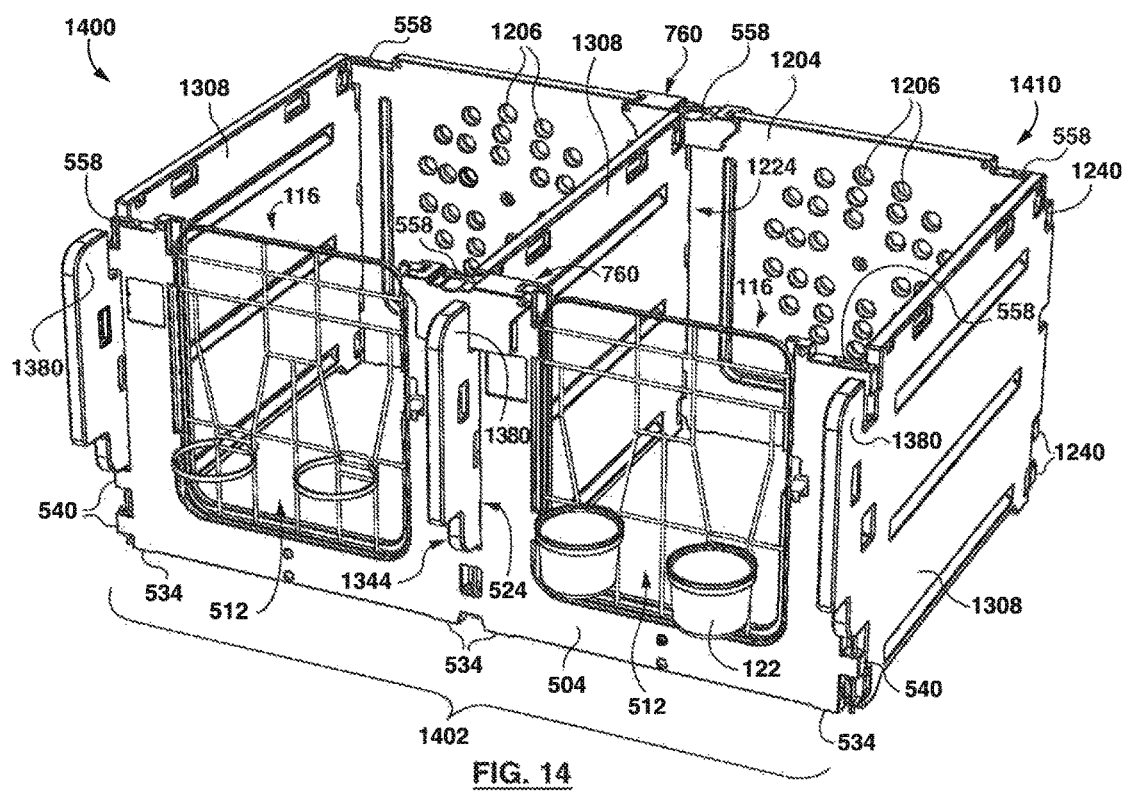
FIG. 14 is a top perspective view of a module of a second exemplary modular animal pen system according to an aspect of the disclosure.

FIG. 14 shows a module 1402 of another exemplary modular pen system 1400. The module 1402 comprises a front panel formed by one of the face panels 504, a rear panel 1204 with a rotary vent and two opposed side panels formed by profile panels 1308 having partition extension elements 1380, with a third profile panel 1308 serving as a divider panel. The profile panels 1308 are secured to and extend between the front panel 504 and the rear panel 1204 to form an open-topped primary enclosure indicated generally by reference 1410. The doorway apertures 512 of the face panel 504 serving as the front panel receive respective feeding gates 116.

The pen systems 100, 1400 described herein are intended primarily for indoor use and would rest on a generally planar floor of concrete, cement or other suitable material and as such the pen systems 100, 1400 have an open bottom.

The face panels 504, rear panels 1204 and profile panels 608, 1308 may be made, for example, by rotational molding.

Certain currently preferred embodiments have been described by way of example. It will be apparent to persons skilled in the art that a number of variations and modifications can be made without departing from the scope of the invention as defined in the claims.

What is claimed is:

1. A modular animal pen system, comprising at least one module, wherein each module comprises:
   a single front panel;
   a single rear panel;
   two opposed side panels secured to and extending between the front panel and the rear panel to form a primary enclosure;
   the front panel having at least two adjacent doorway apertures formed therein, the doorway apertures being adapted to receive respective selectively closable gates;
   the front panel having a mullion disposed between the at least two doorway apertures;
   the front panel being a single, continuous panel that defines the doorway apertures and the mullion;
   each mullion having a vertically continuous first slot formed therethrough;
   each first slot being closed at an inferior end of the front panel and having an open end of the first slot that is open at a superior end of the front panel;
   the rear panel having at least one vertically continuous second slot formed therethrough in registration with each first slot;
   each second slot being closed at an inferior end of the rear panel and having an open end of the second slot that is open at a superior end of the rear panels;
   the animal pen system further comprising a removable divider panel whose longitudinal ends are sized to fit removably within the respective slots so that, when the divider panel is positioned with its longitudinal ends within the respective slots, the divider panel extends between the front panel and the rear panel so as to divide the primary enclosure into two secondary enclosures;
   wherein the divider panel is adapted to be vertically slidable into and out of the first slot and the second slot via the open end of the first slot and the open end of the second slot;
   wherein: each front panel and each rear panel has a respective retention element associated with each slot;
   the retention elements are movably carried by the respective front and rear panels so as to be movable between:
      a first position on the respective front and rear panels in which the retention element obstructs the open end of the respective slot whereby the retention element vertically traps the divider panel in the respective slot; and a second position on the respective front and rear panels in which the retention element leaves the open end of the respective mullion slot unobstructed; and wherein the module comprising the front panel, the rear panel and the two side panels remains structurally rigid after removal of the divider panel.

2. The modular animal pen system of claim 1, wherein:

the front panel and the rear panel are formed by face panels of identical construction so as to be interchangeable with one another whereby the first and second slots are mullion slots; and the side panels and the divider panel are formed by profile panels of identical construction so as to be interchangeable with one another.

3. The modular animal pen of claim 2, wherein:

opposed longitudinal ends of the face panels are interengageable with one another so that face panels can be connected end-to-end; and when connected, the longitudinal ends of two adjacent face panels form a junction slot therebetween, the junction slot being adapted to removably receive the longitudinal end of one of the profile panels.

4. The modular animal pen system of claim 3, wherein:

the longitudinal ends of the profile panels each comprise:
  a longitudinally extending profile panel projection sized to fit removably within the mullion slots and the junction slots; and
  at least one shoulder disposed inwardly of the profile panel projection;

wherein the shoulders are positioned to cooperate to longitudinally trap the profile panels between the front panel and the rear panel when the profile panel projections are received in the first and second slots.

5. The modular animal pen system of claim 1, wherein the side panels and the divider panel are formed by profile panels of identical construction so as to be interchangeable with one another.

6. The modular animal pen of claim 5, wherein:

the front panel and the rear panel are of differing construction;

opposed longitudinal ends of the rear panel are interengageable with one another so that a plurality of the rear panels can be connected end-to-end;

when connected, the longitudinal ends of two adjacent rear panels form a rear panel junction slot therebetween, the rear panel junction slot being adapted to removably receive the longitudinal end of one of the profile panels;

opposed longitudinal ends of the front panel are interengageable with one another so that a plurality of the front panels can be connected end-to-end;

when connected, the longitudinal ends of two adjacent front panels form a front panel junction slot therebetween, the front panel junction slot being adapted to removably receive the longitudinal end of one of the profile panels.

7. The modular animal pen system of claim 6, wherein:

each of the first slots is closed at an inferior end of the front panel and open at superior ends of the front panels; and each of the second slots is closed at inferior ends of the rear panels and open at superior ends of the rear panels.

8. The modular animal pen system of claim 7, wherein:

the longitudinal ends of the profile panels each comprise:
  a longitudinally extending profile panel projection sized to fit removably within the first slots, the second slots and the junction slots; and
  at least one shoulder disposed inwardly of the profile panel projection;

wherein the shoulders are positioned to cooperate to longitudinally trap the profile panels between the front panel and the rear panel when the profile panel projections are received in the first and second slots.

9. The modular animal pen system of claim 8, wherein:

each front panel has a first retention element associated with its first slot;

each rear panel has a second retention element associated with its second slot;

each of the first retention element and the second retention element is movably carried by the respective front panel and rear panel so as to be movable between:
  a first position in which the retention element obstructs the open end of the respective slot for vertically trapping one of the profile panel projections in the respective slot; and
  a second position in which the retention element leaves the open end of the respective slot unobstructed.

* * * * *